US008139381B2

(12) United States Patent
Moon et al.

(10) Patent No.: US 8,139,381 B2
(45) Date of Patent: Mar. 20, 2012

(54) POWER CONVERTER, AND SWITCHING CONTROLLER AND DRIVING METHOD THEREOF

(75) Inventors: Sang-Cheol Moon, Bucheon (KR); Hang-Seok Choi, Gunpo (KR); Young-Bae Park, Anyang (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 369 days.

(21) Appl. No.: 12/534,227

(22) Filed: Aug. 3, 2009

(65) Prior Publication Data
US 2010/0039834 A1    Feb. 18, 2010

(30) Foreign Application Priority Data

Aug. 13, 2008 (KR) .................. 10-2008-0079287

(51) Int. Cl.
*H02M 3/335* (2006.01)
(52) U.S. Cl. ...................... 363/21.16; 363/97
(58) Field of Classification Search .............. 363/20, 363/21.07, 21.08, 21.12–21.16, 21.18, 95, 363/97; 323/222, 282–286
See application file for complete search history.

(56) References Cited

U.S. PATENT DOCUMENTS

| 4,674,385 A | 6/1987 | Bellini | |
| 4,692,853 A | 9/1987 | de Sartre et al. | |
| 4,766,528 A | 8/1988 | Marinus | |
| 4,794,270 A | 12/1988 | Park | |
| 4,937,728 A | 6/1990 | Leonardi | |
| 5,689,407 A * | 11/1997 | Marinus et al. | 363/21.15 |
| 5,852,550 A * | 12/1998 | Majid et al. | 363/21.05 |
| 6,646,894 B2 * | 11/2003 | Hong et al. | 363/21.01 |
| 6,927,989 B2 * | 8/2005 | Fukumoto | 363/95 |
| 7,079,404 B2 * | 7/2006 | Hong et al. | 363/21.01 |
| 7,957,162 B2 * | 6/2011 | Choi et al. | 363/21.13 |

* cited by examiner

*Primary Examiner* — Rajnikant Patel
(74) *Attorney, Agent, or Firm* — Okamoto & Benedicto LLP

(57) ABSTRACT

In a power converter, a primary coil of a transformer receives an input voltage, and a first terminal of a switch is coupled to the primary coil. An output unit includes a secondary coil of the transformer, and outputs an output voltage to which the input voltage is converted by the transformer. A switching controller receives a feedback voltage corresponding to the output voltage and a sensing voltage corresponding to a current flowing between the first terminal and a second terminal of the switch. The switching controller determines whether to perform an operation of a burst mode based on the feedback voltage. The switching controller generates a control signal by comparing the sensing voltage with a comparison voltage during a first period of the burst mode, generates the control signal by comparing the sensing voltage with a voltage corresponding to the feedback voltage during a second period of the burst mode, and transmits the control signal to a control terminal of the switch.

21 Claims, 7 Drawing Sheets

POWER CONVERTER, AND SWITCHING CONTROLLER AND DRIVING METHOD THEREOF

CROSS-REFERENCE TO RELATED APPLICATION

This application claims priority to and the benefit of Korean Patent Application No. 10-2008-0079287 filed in the Korean Intellectual Property Office on Aug. 13, 2008, the entire contents of which are incorporated herein by reference.

BACKGROUND

1. Field

The field relates to a power converter, and a switching controller and a driving method thereof.

2. Description of the Related Art

A power converter, for example a switching mode power supply (SMPS), rectifies an input alternating current (AC) voltage to generate an input direct current (DC) voltage, and converts the input DC voltage to an output voltage having a different level from the input DC voltage. The power converter is used for a power supply of an electronic device, for example a cellular telephone, a computer, or a television.

An operation mode of the electronic device includes a normal operation mode and a standby operation mode. The electronic device consumes a large amount of power in the normal operation mode, as compared to the standby operation mode.

Generally, the power converter provides a burst mode in which an operation for turning off a switch of a primary side of a transformer included in the power converter after turning on the switch during a predetermined time in accordance with a feedback voltage is repeated. The power converter generates the output voltage that is required in the standby operation mode during a burst mode such that the electronic device can reduce power consumption in the standby operation mode.

The power converter may have a threshold range between a high threshold voltage and a low threshold voltage for the burst mode, and the feedback voltage of the power converter may be inversely proportional to the output voltage of the power converter. In this case, in the burst mode, the power converter turns on the switch when the feedback voltage is higher than the high threshold voltage, and turns off the switch when the feedback voltage is lower than the low threshold voltage.

A current, which flows to the switch when the feedback voltage reaches the high threshold voltage at a starting time of the burst mode, has the highest magnitude among currents flowing to the switch in the burst mode. That is, a large amount of current may flow to the switch at the starting time of the burst mode. Parasitic mechanical vibrations can occur in the power converter by the large amount of current flowing to the switch such that an audible noise can be caused.

SUMMARY

In an embodiment, a power converter including a primary coil, a switch, an output unit, and a switching controller is provided. The primary coil receives an input voltage, and the switch includes a first terminal coupled to the primary coil, a second terminal, and a control terminal. The output unit includes a secondary coil, and outputs an output voltage. The primary coil and the secondary coil form a transformer, and the input voltage is converted to the output voltage by the transformer. The switching controller receives a feedback voltage corresponding to the output voltage and a sensing voltage corresponding to a current flowing between the first terminal and the second terminal of the switch, determines whether to perform an operation of a burst mode based on the feedback voltage, generates a control signal by comparing the sensing voltage with a comparison voltage during a first period of the burst mode, generates the control signal by comparing the sensing voltage with a first voltage corresponding to the feedback voltage during a second period of the burst mode, and transmits the control signal to the control terminal of the switch. The second period is subsequent to the first period.

In an embodiment, a switching controller of a power converter including a transformer and a switch is provided. The transformer includes a primary coil configured to receive an input voltage and a secondary coil configured to transmit an output voltage, and the switch includes a first terminal coupled to the primary coil, a second terminal, and a control terminal. The switching controller includes a first comparator, a second comparator, a voltage controller, and a gate signal generator. The first comparator receives a feedback voltage corresponding to the output voltage, and compares the feedback with a burst reference voltage to output a burst control signal. The voltage controller generates a comparison voltage in response to the burst control signal having a first level, and the comparison voltage is gradually increased. The second comparator compares a sensing voltage with the comparison voltage to generate a gate control signal during a first period of a burst mode, and compares the sensing voltage with a first voltage corresponding to the feedback voltage to generate a gate control signal during a second period of the burst mode. The second period is subsequent to the first period, the sensing voltage corresponds to a current flowing between the first terminal and the second terminal of the switch, and the comparison voltage is lower than the first voltage during the first period. The gate signal generator performs the burst mode to perform an operation for turning off the switch after turning on the switch at least once in accordance with the gate control signal while the burst control signal has the first level, and turns off the switch while the burst control signal has a second level being different from the first level.

In an embodiment, a method of driving a power converter including a transformer and a switch is provided. The transformer includes a primary coil configured to receive an input voltage and a secondary coil configured to transmit an output voltage, and the switch includes a first terminal coupled to the primary coil, a second terminal, and a control terminal. The method includes operating the power converter in a burst mode, generating a comparison voltage during a first period of the burst mode, the comparison voltage being gradually increased, comparing a sensing voltage with the comparison voltage to determine an operation of the switch during the first period, and comparing the sensing voltage with a voltage corresponding to a feedback voltage to determine the operation of the switch during a second period of the burst mode. The sensing voltage corresponds to a current flowing between the first terminal and the second terminal of the switch, the second period is subsequent to the first period, and the feedback voltage corresponds to the output voltage.

DETAILED DESCRIPTION

Figure 1:
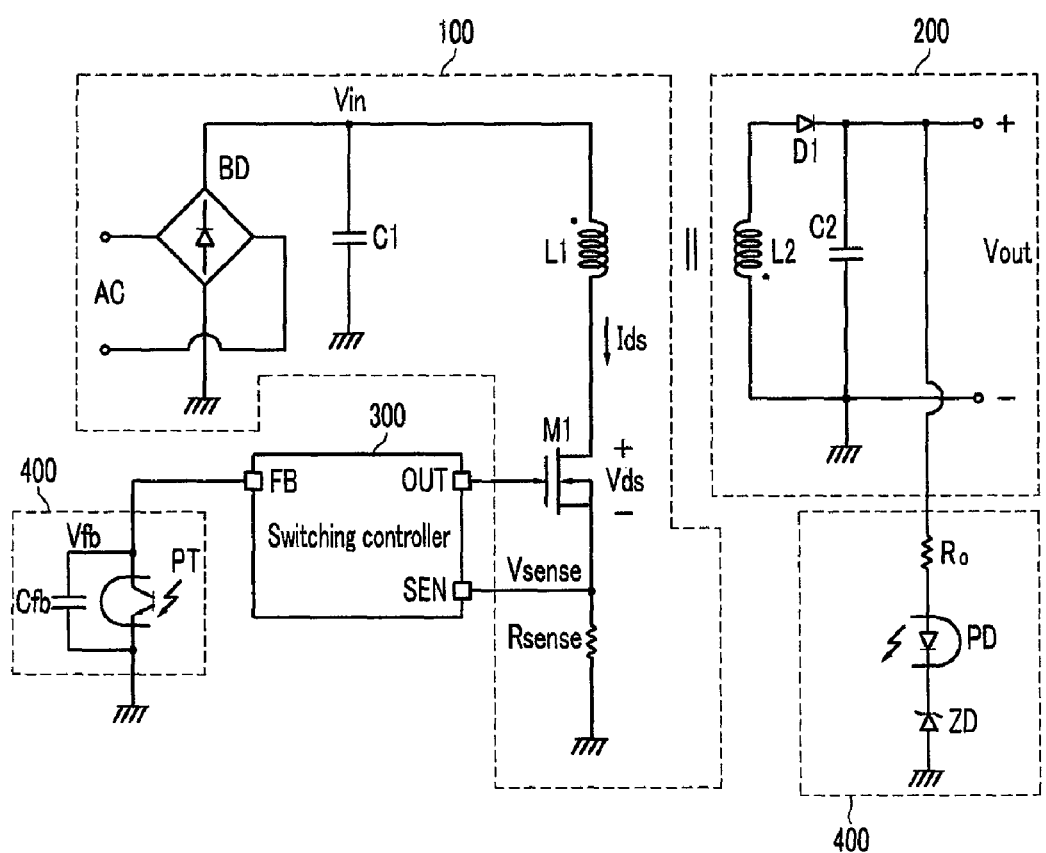
FIG. 1 is a schematic diagram of a power converter according to an embodiment.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise/include" and variations such as "comprises/includes" or "comprising/including" will be understood to imply the inclusion of stated elements but not the exclusion of any other elements.

FIG. 1 is a schematic diagram of a power converter according to an embodiment.

Referring to FIG. 1, a power converter, by way of a non-limiting example, includes a power supplier 100, an output unit 200, a switching controller 300, and a feedback circuit 400.

The power supplier 100, by way of a non-limiting example, includes a rectifier BD, a capacitor C1, a primary coil L1 of a transformer, a switch M1, and a sensing resistor Rsense. The rectifier BD rectifies an input AC voltage to output an input voltage Vin, and the capacitor C1 smoothes the input voltage Vin. The rectifier BD may include a full-wave bridge diode. The primary coil L1 includes a first terminal coupled to the rectifier BD and the capacitor C1, and a second terminal.

The switch M1 may include a control terminal and two other terminals that may correspond to a gate, a drain, and a source, respectively. The drain of the switch M1 is coupled to the second terminal of the primary coil L1. While the switch M1 has been exemplified as an N-channel field effect transistor in FIG. 1, various other switches may used as the switch M1 in some embodiments.

The sensing resistor Rsense is coupled between the source of the switch M1 and a voltage terminal, for example a ground terminal. The sensing resistor Rsense senses a switch current Ids flowing from the drain of the switch M1 to the source of the switch M1 when the switch M1 is turned on, and outputs a sensing voltage Vsense corresponding to the switch current Ids to the switching controller 300.

The output unit 200 includes a secondary coil L2 of the transformer, a diode D1, and a capacitor C2. In addition, the output unit 200 includes two output terminals (+) and (−). The output terminal (−) is coupled to a voltage terminal, for example the ground terminal. A voltage between the two output terminals (+) and (−) is an output voltage Vout of the output unit 200.

The secondary coil L2 includes one terminal coupled to an anode of the diode D1 and another terminal, and a cathode of the diode D1 is coupled to the output terminal (+). The capacitor C2 includes one terminal coupled to the output terminal (+), and another terminal coupled to other terminal of the secondary coil L2 and the output terminal (−).

Figure 2:
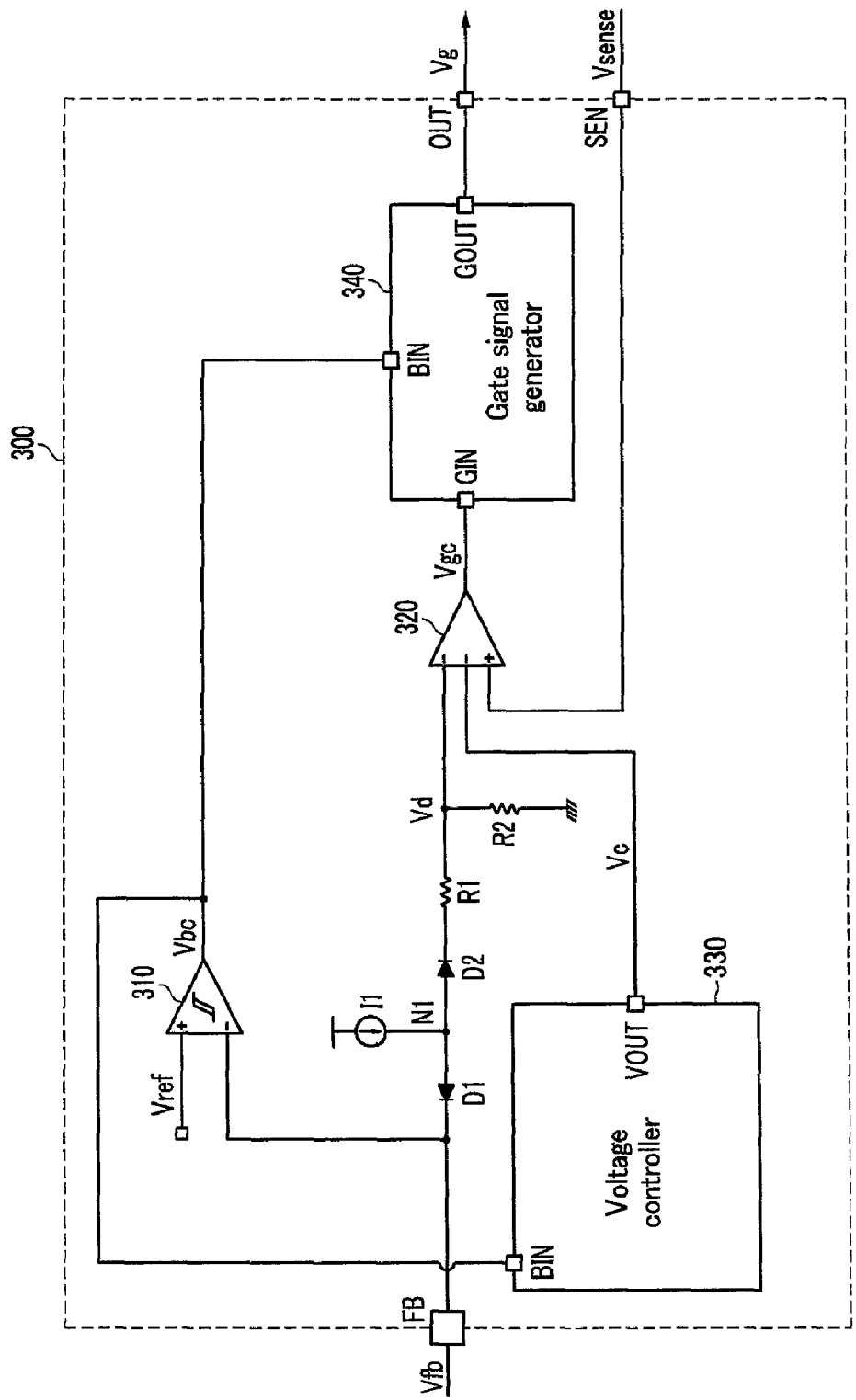
FIG. 2 is a schematic diagram of a switching controller according to an embodiment.

The switching controller 300 includes a feedback terminal FB for receiving a feedback voltage Vfb, a sensing voltage terminal SEN for receiving the sensing voltage, and a gate signal output terminal OUT for outputting a gate signal (e.g., Vg of FIG. 2). The switching controller 300 determines a comparison voltage (e.g., Vc of FIG. 2) to prevent a large amount of switch current Ids from flowing to the switch M1 at a starting time of the burst mode. The comparison voltage Vc is compared with the sensing voltage Vsense at the starting time of the burst mode, and may have a continuously increasing value.

The gate signal output terminal OUT is coupled to the gate of the switch M1. The switching controller 300 may generate a clock signal (e.g., CLK of FIG. 4) having a predetermined cycle. The switching controller 300 may generate the gate signal Vg based on the clock signal CLK, the sensing voltage Vsense, the feedback voltage Vfb, and the comparison voltage Vc, and may output the gate signal at the gate signal output terminal OUT. When the switch M1 is the N-channel transistor, the gate signal Vg has a high voltage for turning on the switch M1 and a low voltage for turning off the switch M1. In some embodiments, the switch M1 may be a P-channel transistor, and the gate signal Vg may have a low voltage for turning on the switch M1 and a high voltage for turning off the switch M1.

The feedback circuit 400, by way of non-limiting example, includes a resistor Ro, a Zener diode ZD, a photodiode PD, a capacitor Cfb, and a phototransistor PT. The resistor Ro, the Zener diode ZD, and the photodiode PD are coupled in series between the output terminal (+) and a voltage terminal, for example the ground terminal. The phototransistor PT is coupled between the feedback terminal FB of the switching controller 300 and a voltage terminal, for example the ground terminal, and forms a photo-coupler (also referred to as "an opto-coupler") together with the photodiode PD. In some embodiments, various other feedback circuits instead of the photo-coupler may be used as the feedback circuit 400.

A current according to the output voltage Vout flows to the photodiode PD such that the photodiode PD emits a light corresponding to the current. The light from the photodiode PD is transmitted to a base of the phototransistor PT, and a current corresponding to the light flows from a collector to an emitter of the phototransistor PT. A current that is transmitted to the feedback terminal FB by a current source (e.g., I1 of FIG. 2) included in the switching controller 300 is divided into a current flowing to the phototransistor PT and a current flowing to the capacitor Cfb. The feedback voltage Vfb is charged to the capacitor Cfb by the current flowing to the capacitor Cfb. Accordingly, the higher the output voltage Vout is, the lower the feedback voltage Vfb is. On the contrary, the lower the output voltage Vout is, the higher the feedback voltage Vfb is.

Hereinafter, a switching controller according to an embodiment will be described with reference to FIG. 2 to FIG. 5.

Figure 3:
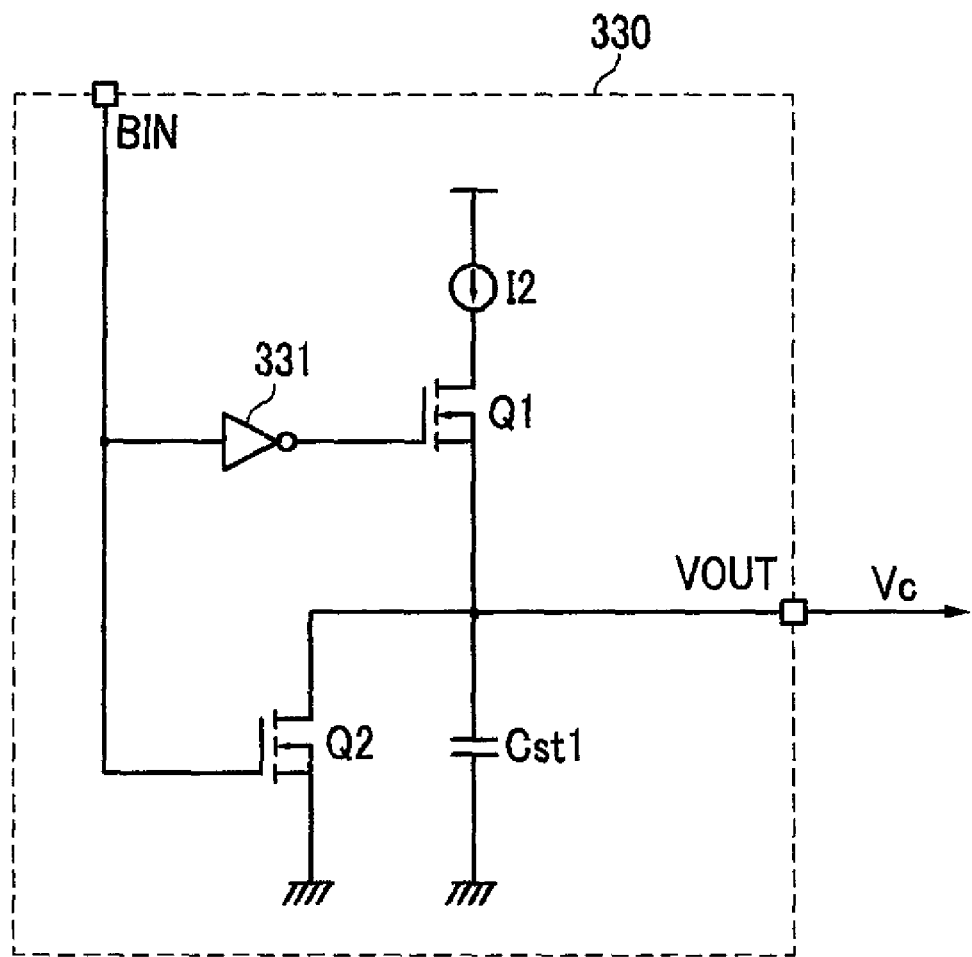
FIG. 3 a schematic circuit diagram of a voltage controller according to an embodiment.
Figure 4:
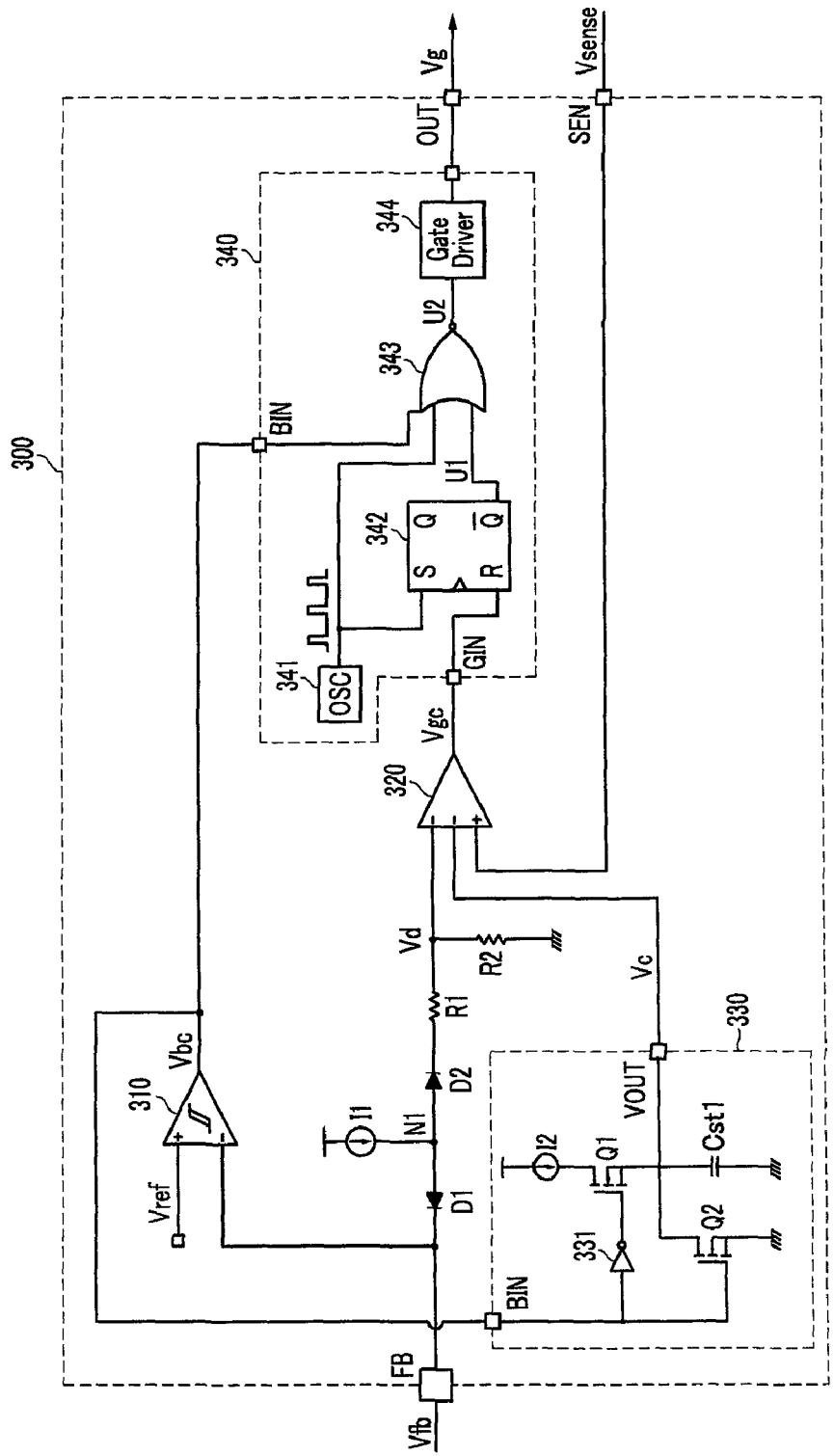
FIG. 4 is a schematic diagram of a switching controller including one example of a voltage controller and a gate signal generator.
Figure 5:
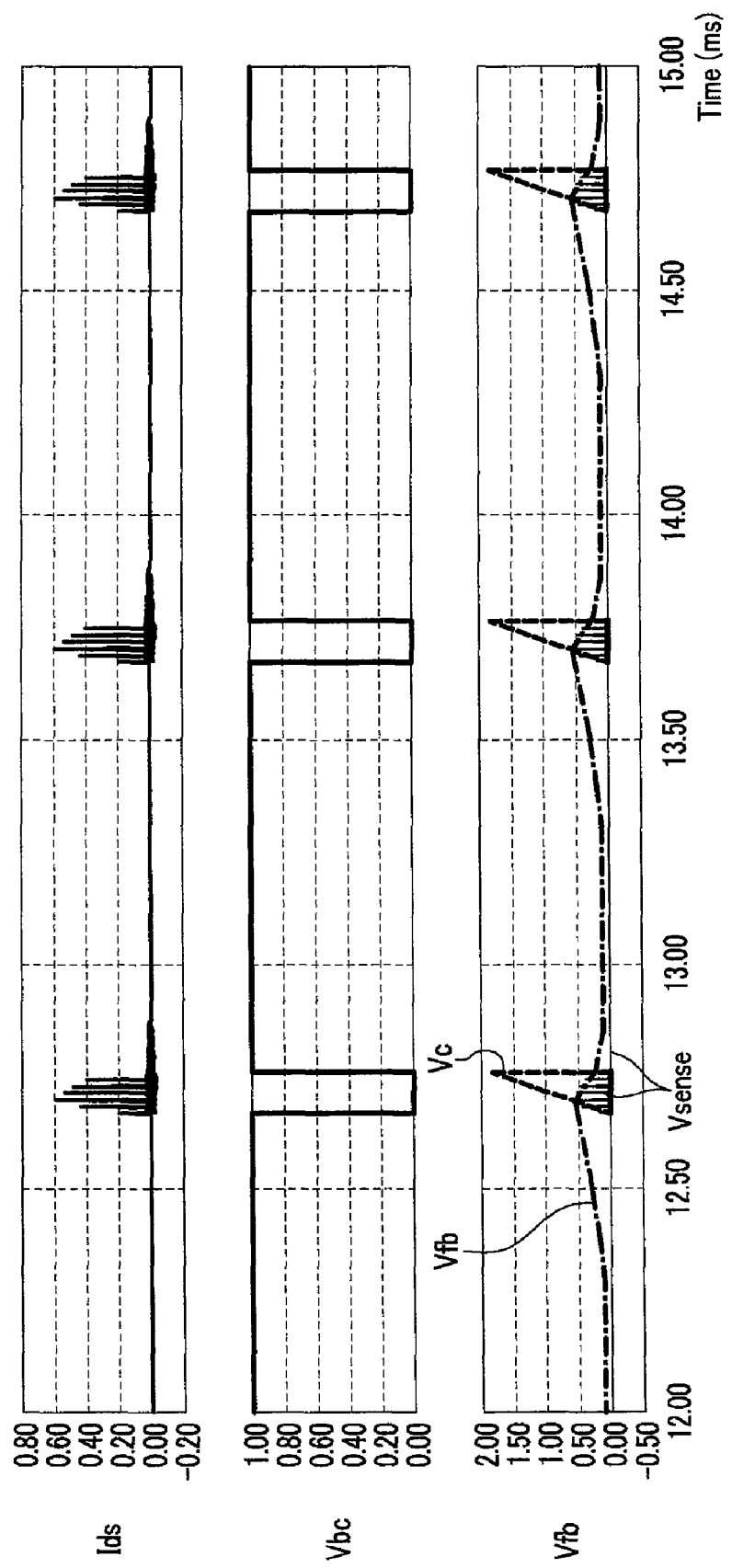
FIG. 5 is a schematic diagram showing an operation at a starting time of a burst mode in a switch controller according to an embodiment.

FIG. 2 is a schematic diagram of a switching controller according to an embodiment, FIG. 3 a schematic circuit diagram of a voltage controller according to a an embodiment, and FIG. 4 is a schematic diagram of a switching controller including one example of a voltage controller and a gate signal generator. FIG. 5 is a schematic diagram showing an operation at a starting time of a burst mode in a switch controller according to an embodiment.

Referring to FIG. 2, a switching controller 300, by way of a non-limiting example, includes comparators 310 and 320, a voltage controller 330, resistors R1 and R2, diodes D1 and D2, a current source I1, and a gate signal generator 340.

The comparator 310 includes a non-inverting terminal (+), an inverting terminal, (−), and an output terminal. The inverting terminal (−) is coupled between the feedback terminal FB and a node N1 coupled to anodes of the diodes D1 and D2, and receives a burst voltage. The non-inverting terminal (+) receives a burst reference voltage Vref. The current source I1 supplies a current to the node N1, and may correspond to the current source for generating the feedback voltage Vfb. The burst voltage is a voltage of the node N1, and is approximately the same as the feedback voltage Vfb. A cathode of the diode D1 is coupled to the feedback terminal FB, and the resistors R1 and R2 are coupled in series between a cathode of the diode and a voltage terminal, for example the ground terminal. The comparator 310 compares the feedback voltage Vfb with the burst reference voltage Vref to generate a burst control signal Vbc, and transmits the burst control signal Vbc to the gate signal generator 340 through the output terminal. The comparator 310 may be a comparator having a hysteresis characteristic. In this case, the comparator 310 compares the feedback voltage Vfb with two threshold voltages determined by the burst reference voltage Vref, i.e., a low threshold voltage VrefL and a high threshold voltage VrefH. When the feedback voltage Vfb is increased, the comparator 310 outputs the burst control signal Vbc having a low level if the feedback voltage Vfb is higher than the high threshold voltage VrefH. When the feedback voltage Vfb is decreased, the comparator 310 outputs the burst control signal Vbc having a high level if the feedback voltage Vfb is lower than the low threshold voltage VrefL.

The comparator 320 includes two inverting terminals (−), a non-inverting terminal (+), and an output terminal. One inverting terminal (−) is coupled to a node between the resistors R1 and R2, and receives a divided voltage Vd obtained by dividing the feedback voltage Vfb using the resistors R1 and R2 coupled in series. Another inverting terminal (−) is coupled to a voltage controller 330, and receives the comparison voltage Vc. The non-inverting terminal (+) is coupled to the sensing voltage terminal SEN, and receives the sensing voltage Vsense. The comparator 320 outputs the gate control signal Vgc having a high level at the output terminal if the sensing voltage Vsense is higher than a lower one of the comparison voltage Vc and the divided voltage Vd, and outputs the gate control signal Vgc having a low level at the output terminal if otherwise.

The voltage controller 330 includes a burst signal input terminal BIN, and a voltage output terminal VOUT for outputting the comparison voltage Vc. The burst signal input terminal BIN is coupled to the output terminal of the comparator 310, and receives the burst control signal Vbc. The voltage controller 330 continuously increases the comparison voltage Vc during the burst mode in which the burst control signal Vbc has the low level, and initializes the comparison voltage Vc to an initial value, for example 0V, during a period in which the burst control signal Vbc has the high level.

The gate signal generator 340 includes a burst signal input terminal BIN, a gate control signal input terminal GIN, and a gate signal output terminal GOUT for a gate signal Vg. The burst signal input terminal BIN is coupled to the output terminal of the comparator 310, and receives the burst control signal Vbc. The gate control signal input terminal GIN is coupled to the output terminal of the comparator 320, and receives the gate control signal Vgc. The gate signal generator 340 generates the gate signal Vg for turning the switch M1 on and off using the burst control signal Vbc and the gate control signal Vgc, and outputs at the gate signal output terminal GOUT. In a standby operation mode, when the burst control signal Vbc has the low level, the gate signal generator 340 generates the gate signal Vg for repeating on and off of the switch M1 to perform an operation of the burst mode. When the burst control signal Vbc has the high level, the gate signal generator 340 generates the gate signal Vg for turning off the switch M1. In a normal operation mode, the gate signal generator 340 generates the gate signal Vg in accordance with the gate control signal Vgc to maintain the output voltage Vout of the normal operation mode.

Referring to FIG. 3, the voltage controller 330, by way of a non-limiting example, includes an inverter 331, switches Q1 and Q2, a current source I2, and a capacitor Cst1. While the switches Q1 and Q2 has been exemplified as N-channel field effect transistors each having a gate, a drain, and a source as a control terminal and two other terminals, various other switches may be used as the switches Q1 and Q2 in some embodiments.

The inverter 331 includes an input terminal and an output terminal, and the input terminal is coupled to the burst signal input terminal BIN. In the switch Q1, a gate is coupled to the output terminal of the inverter 331, a drain is coupled to the current source I2, and a source is coupled to one terminal of the capacitor Cst1 and the voltage output terminal VOUT. In the switch Q2, a gate is coupled to the burst signal input terminal BIN, and a drain is coupled to the one terminal of the capacitor Cst1 and the voltage output terminal VOUT. A source of the switch Q2 and another terminal of the capacitor Cst1 are coupled to a voltage terminal, for example the ground terminal.

In the burst mode in which the burst control signal Vbc has the low level, the inverter 331 outputs a high level signal, and the high level signal is applied to the gate of the switch Q1 such that the switch Q1 is turned on. In addition, the burst control signal Vbc having the low level output from the burst signal input terminal BIN is applied to the gate of the switch Q2 such that the switch Q2 is turned off. Accordingly, a current from the current source I2 is supplied to the capacitor Cst1 through the switch Q1 to charge the capacitor Cst1, and a voltage of the capacitor Cst1 becomes the comparison voltage Vc. As a result, in the burst mode, the voltage of the capacitor Cst1, i.e., the comparison voltage Vc, is continuously increased by the current supplied from the current source I2. When the burst mode ends, a level of the burst control signal Vbc is changed to the high level such that the switch Q1 is turned off and the switch Q2 is turned on. Accordingly, the comparison voltage Vc charged to the capacitor Cst1 is discharged through the switch Q2.

Next, referring to FIG. 4, the gate signal generator 340, by way of a non-limiting example, includes an oscillator 341, an SR latch 342, a NOR gate 343, and a gate driver 344.

The oscillator 341 generates a clock signal CLK having a predetermined cycle, and transmits the clock signal CLK to the SR latch 342 and the NOR gate 343. The clock signal alternately has a high level and a low level.

The SR latch 342 includes a set terminal S for receiving the clock signal CLK, a reset terminal R for receiving the gate control signal Vgc, an output terminal Q, and an inverted output terminal /Q. The SR latch 342 generates a latch output U1 in accordance with the gate control signal Vgc and the clock signal CLK, and transmits the latch output U1 to the NOR gate 343 through the inverted output terminal/Q. The SR latch 342 outputs the latch output U1 having a low level at the inverted output terminal/Q when a high level signal is input to the set terminal S, and outputs the latch output U1 having a high level at the inverted output terminal/Q when the high level signal is input to the reset terminal R.

The NOR gate 343 generates a NOR gate output U2 by a NOR operation of the burst control signal Vbc, the clock signal CLK, and the latch output U1, and transmits the NOR gate output U2 to the gate driver 344. The gate driver 344 generates the gate signal Vg having a high voltage when the NOR gate output U2 is the high level, and generates the gate signal Vg having a low voltage when the NOR gate output U2 is the low level. The gate driver 344 outputs the gate signal Vg to the gate of the switch M1

Next, an operation of a power converter will be described with reference to FIG. 4 and FIG. 5.

When the output voltage Vout of the power converter is sufficiently high, i.e., the feedback voltage Vfb is sufficiently low in the standby operation mode, the comparator 310 outputs the burst control signal Vbc having the high level. Accordingly, the NOR gate 343 outputs the NOR gate output U2 having the low level in the gate signal generator 340, and the gate driver 344 outputs the gate signal Vg having the low level such that the switch M1 maintains an off state. When the switch M1 maintains the off state, the output voltage Vout is decreased such that the feedback voltage Vfb is increased. As shown in FIG. 5, when the feedback voltage Vfb reaches the high threshold voltage VrefH, for example 0.50V, the comparator 310 outputs the burst control signal Vbc having the low level such that the burst mode starts.

In the burst mode, the switch Q1 is turned on and the switch Q2 is turned off in the voltage controller 330 such that a current supplied from the current source I2 is charged to the capacitor Cst1. Accordingly, the comparison voltage Vc of the capacitor Cst1 is continuously increased and is applied to another inverting terminal (−) of the comparator 320 through the voltage output terminal VOUT.

At the starting time of the burst mode, the comparator 320 compares the comparison voltage Vc with the sensing voltage Vsense since the comparison voltage Vc is lower than the divided voltage Vd of the feedback voltage Vfb, Since the switch M1 has been turned off before starting the burst mode, the switch current Ids is approximately 0 A. Accordingly, the sensing voltage Vsense is lower than the comparison voltage Vc at the starting time of the burst mode. Accordingly, the SR latch 342 receives the gate control signal Vgc having the low level at the reset terminal R. In this case, when the oscillator 341 sets the clock signal CLK to the high level, the SR latch 342 outputs the latch output U1 having the low level at the inverted output terminal/Q. Next, the clock signal CLK is changed to the low level, and the SR latch 342 maintains the latch output U1 at the low level while the clock signal CLK has the low level. Since the burst control signal Vbc has the low level, the NOR gate 343 outputs the NOR gate output having the high level while the latch output U1 has the low level. Accordingly, the gate driver 344 outputs the gate signal Vg having the high voltage to turn on the switch M1.

When the switch M1 is turned on, the switch current Ids flowing to the switch M1 is increased such that the sensing voltage Vsense is increased. When the sensing voltage Vsense is higher than the comparison voltage Vc, the comparator 320 outputs the gate control signal Vgc having the high level. The SR latch 342 outputs the latch output U1 having the high level at the inverted output terminal/Q when the gate control signal Vgc having the high level is input to the reset terminal R. Accordingly, the NOR gate 343 outputs the NOR gate output U2 having the low level, and the gate driver 344 outputs the gate signal Vg having the low voltage to turn off the switch M1 in response to the NOR gate output U2 having the low level. As a result, the switch current Ids becomes approximately 0 A, and the sensing voltage Vsense becomes lower than the comparison voltage Vc such that the switch M1 is turned on again.

As such, an operation for turning off the switch M1 after turning on the switch M1 is repeated by a comparison between the comparison voltage Vc and the sensing voltage Vsense. When the comparison voltage Vc becomes higher than the divided voltage Vd of the feedback voltage Vfb by repeating the above operation, the comparator 320 compares the divided voltage Vd of the feedback voltage Vfb with the sensing voltage Vsense. As a result, an operation for turning off the switch M1 after turning on the switch M1 is repeated by a comparison between the divided voltage Vd and the sensing voltage Vsense.

Therefore, at the starting time of the burst mode, the switch current Ids can be maintained at a small amount since the sensing voltage Vsense is compared with the comparison voltage Vc that is lower than the divided voltage Vd of the feedback voltage Vfb. As a result, audible noise caused by a large amount of the switch current Ids can be reduced.

Figure 6:
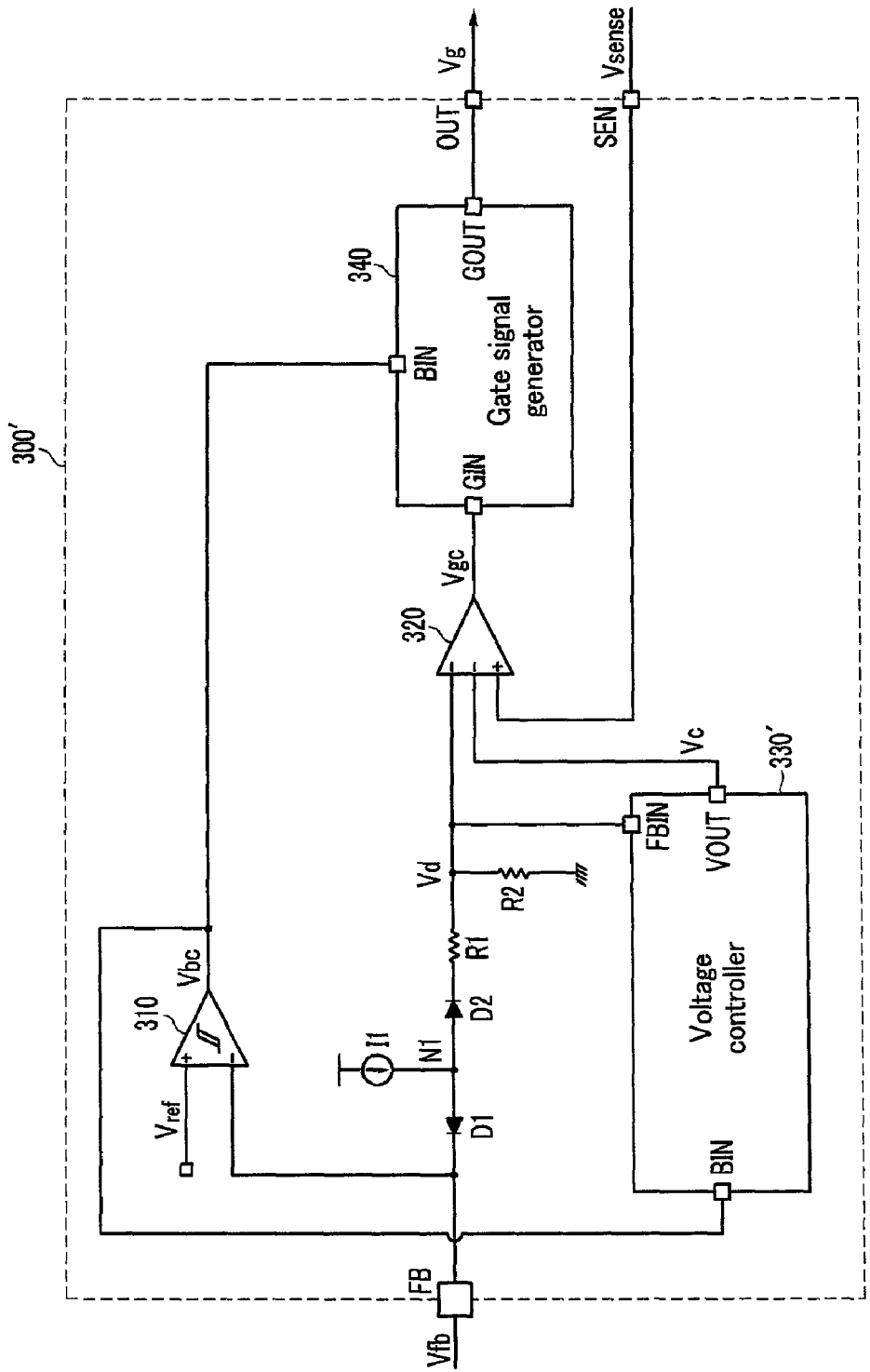
FIG. 6 is a schematic diagram of a power converter according to another embodiment.
Figure 7:
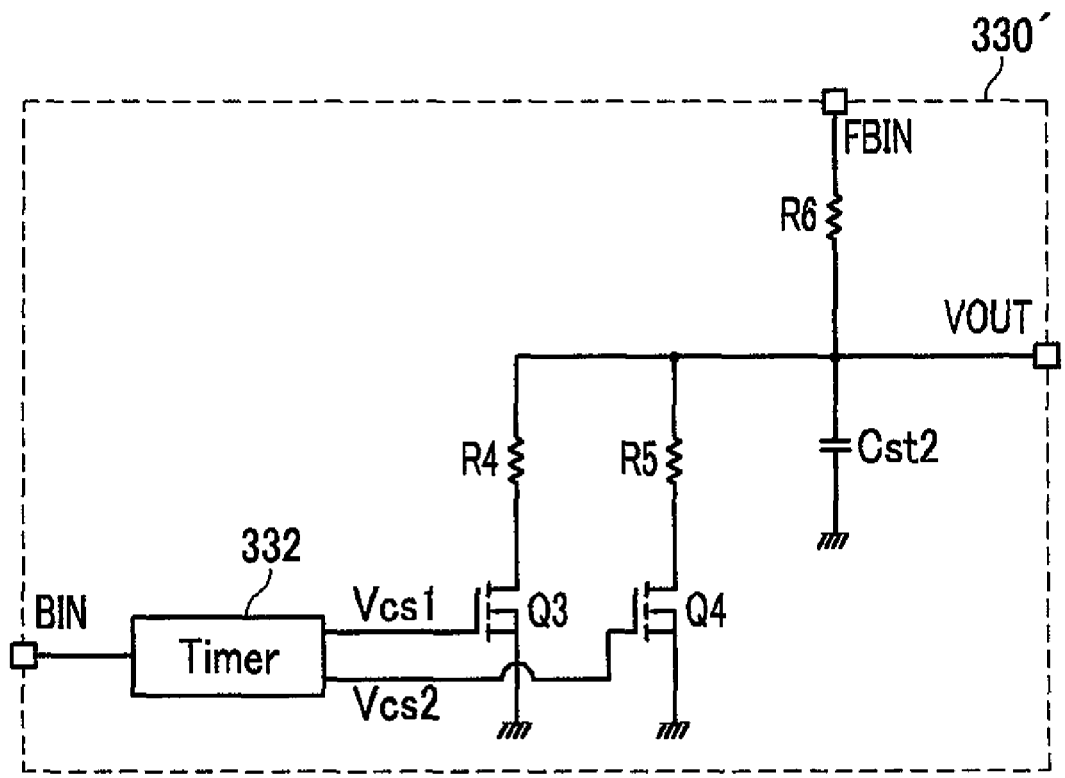
FIG. 7 is a schematic diagram of a voltage controller according to another embodiment.

FIG. 6 is a schematic diagram of a power converter according to another embodiment, and FIG. 7 is a schematic diagram of a voltage controller according to another embodiment.

Referring to FIG. 6, a switching controller 300' may include a voltage controller 330'.

The voltage controller 330' includes a feedback voltage input terminal FBIN, a burst signal input terminal BIN, and a voltage output terminal VOUT. The burst signal input terminal BIN is coupled to the output terminal of the comparator 310, and receives the burst control signal Vbc. The feedback voltage input terminal FBIN is coupled to a node between the resistor R1 and R2, and receives a voltage corresponding to the feedback voltage Vfb, i.e., the divided voltage Vd of the feedback voltage Vfb. The voltage output terminal VOUT is coupled to another inverting terminal (−) of the comparator 320. The voltage controller 330' outputs the comparison voltage Vc at the voltage output terminal VOUT in the burst mode. The voltage controller 330' discretely increases the comparison voltage Vc with the lapse of time. Since the comparison voltage Vc is lower than the divided voltage Vd of the feedback voltage Vfb at a starting time of the burst mode, the comparator 320 compares the sensing voltage Vsense with the comparison voltage Vc to output the gate control signal Vgc. Accordingly, the switch current Ids can be maintained at a small amount as described above. After the comparison voltage Vc is the same as the divided voltage Vd of the feedback voltage Vfb, the comparator 320 compares the sensing voltage Vsense with the divided voltage Vd to output the gate control signal Vgc.

Referring to FIG. 7, the voltage controller 330', by way of a non-limiting example, includes a timer 332, switches Q3 and Q4, resistors R4, R5, and R6, and a capacitor Cst2. While the switches Q3 and Q4 has been exemplified as N-channel field effect transistors each having a gate, a drain, and a source as a control terminal and two other terminals, various other switches may be used as the switches Q3 and Q4 in some embodiments. Although the voltage controller 330' configured to generate the comparison voltage Vc having three voltages is illustrated in FIG. 3, the other circuits configured to generate the comparison voltage Vc having a plurality of voltages may be used as the voltage controller 330'.

The timer 332 is coupled to the burst signal input terminal BIN to receive the burst control signal Vbc, and outputs voltage control signal Vcs1 and Vcs2 in accordance with the burst control signal Vbc. Gates of the switches Q3 and Q4 are coupled to the timer 332, and receive the voltage control signals Vcs1 and Vcs2, respectively. A drain of the switch Q3 is coupled to one terminal of a resistor R4, and a drain of the switch Q4 is coupled to one terminal of the resistor R5. Sources of the switches Q3 and Q4 are coupled to a voltage terminal, for example the ground terminal. The resistor R6 is coupled between the feedback voltage input terminal FBIN and the voltage output terminal VOUT, and the voltage output terminal VOUT is also coupled to another terminal of each of the resistors R4 and R5. The capacitor Cst2 is coupled between the voltage output terminal VOUT and a voltage terminal, for example the ground terminal.

When the burst control signal Vbc having the low level is transmitted to the burst signal input terminal BIN as the burst mode starts, the timer 332 outputs the voltage control signals Vcs1 and Vcs2 each having the high level such that the switches Q3 and Q4 are turned on. Accordingly, a voltage Vc1 obtained by dividing the divided voltage Vd of the feedback voltage Vfb using the resistor R6 and the resistors R4 and R5 coupled in parallel is stored to the capacitor Cst2. The voltage Vc1 is output as the comparison voltage Vc at the voltage output terminal VOUT, and may be calculated as:

$$Vc1 = Vd \cdot \frac{(R4 \,//\, R5)}{R6 + (R4 \,//\, R5)} \quad (1)$$

where $R2 << R6$.

After a predetermined time, the timer 332 sets the voltage control signal Vcs1 to the low level while maintaining the voltage control signal Vcs2 at the high level. Accordingly, the switch Q3 is turned off while the switch Q4 is turned on. As a result, a voltage Vc2 obtained by dividing the divided voltage Vd of the feedback voltage Vfb using the resistor R6 and the resistor R5 is stored to the capacitor Cst2. The voltage Vc2 is output as the comparison voltage Vc at the voltage output terminal VOUT, and may be calculated as:

$$Vc2 = Vd \cdot \frac{R5}{R5 + R6} \quad (2)$$

where $R2 << R6$.

Since the size of the resistors R4 and R5 coupled in parallel is smaller than the size of the resistor R5, the voltage Vc2 is higher than the voltage Vc1.

After a predetermined time, the timer 332 sets the voltage control signal Vcs2 to the low level while maintaining the voltage control signal Vcs1 at the low level. Accordingly, the switch Q4 is turned off while the switch Q3 is turned off. As a result, a voltage Vc3 that is approximately equal to the divided voltage Vd of the feedback voltage Vfb is stored to the capacitor Cst2, and is output as the comparison voltage Vc at the voltage output terminal VOUT. Since the voltage V3 is not a voltage divided by the resistors R4 to R6, the voltage Vc3 is higher than each of the voltages Vc1 and Vc2.

As such, when the burst control signal Vbc has the low level in the burst mode, the timer 332 controls on/off of the switches Q3 and Q4 to sequentially increase the comparison voltage Vc from the voltage Vc1 to the voltage Vc3 via the voltage Vc2. Accordingly, since the comparison voltage, the voltage Vc1 or Vc2 that is lower than the divided voltage Vd of the feedback voltage Vfb, is compared with the sensing voltage Vsense at the starting time of the burst mode, the switch current Ids can be maintained at a small amount. As a result, audible noise generated by a large amount of the switch current Ids can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power converter comprising:
    a primary coil configured to receive an input voltage;
    a first switch including a first terminal coupled to the primary coil, a second terminal, and a control terminal;
    an output unit including a secondary coil, the output unit configured to output an output voltage, the primary coil and the secondary coil forming a transformer, and the input voltage being converted to the output voltage by the transformer; and
    a switching controller configured
    to receive a feedback voltage corresponding to the output voltage and a sensing voltage corresponding to a current flowing between the first terminal and the second terminal of the first switch,
    to determine whether to perform an operation of a burst mode based on the feedback voltage,
    to generate a control signal by comparing the sensing voltage with a comparison voltage during a first period of the burst mode,
    to generate the control signal by comparing the sensing voltage with a first voltage corresponding to the feedback voltage during a second period of the burst mode, the second period being subsequent to the first period, and
    to transmit the control signal to the control terminal of the first switch.

2. The power converter of claim 1, wherein the comparison voltage is lower than the first voltage during the first period.

3. The power converter of claim 2, wherein the switching controller continuously increases the comparison voltage during the first period.

4. The power converter of claim 2, wherein the switching controller discretely increases the comparison voltage during the first period.

5. The power converter of claim 2, wherein the switching controller generates a burst control signal in accordance with the feedback voltage,
    wherein the switching controller performs the burst mode to perform an operation for turning off the first switch after turning on the first switch at least once while the burst control signal has a first level, and turns off the first switch while the burst control signal has a second level being different from the first level, and
    wherein the switching controller comprises a voltage controller configured to generate the comparison voltage in response to the burst control signal having the first level.

6. The power converter of claim 5, wherein the voltage controller comprises:
    a current source; and
    a capacitor configured to be charged by a current supplied from the current source while the burst control signal has the first level and to be discharged the burst control signal has the second level, wherein a voltage charged to the capacitor corresponds to the comparison voltage.

7. The power converter of claim 6, wherein the voltage controller further comprises:
a second switch configured to be turned on in response to the burst control signal having the first level, the second switch coupled between the current source and the capacitor; and
a third switch configured to be turned on in response to the burst control signal having the second level, the third switch coupled between the capacitor and a voltage terminal.

8. The power converter of claim 5, wherein the voltage controller divides the first voltage to generate at least one second voltage during the first period, and outputs the at least one second voltage as the comparison voltage in ascending order.

9. The power converter of claim 8, wherein the voltage controller comprises:
a first resistor coupled between a node and a voltage output terminal, the voltage output terminal configured to output the comparison voltage, and the node being applied with the first voltage; and
a second resistor and a second switch coupled in series between the voltage output terminal and a voltage terminal,
wherein the second switch is turned on during the first period and is turned off during the second period.

10. The power converter of claim 9, wherein the voltage controller further comprises a third resistor and a third switch coupled in series between the voltage output terminal and the voltage terminal,
wherein the third switch is turned on during a third period and is turned off during a fourth period, and the first period includes the third period and the fourth period.

11. The power converter of claim 10, wherein the voltage controller further comprises a timer configured to control the second switch and the third switch in response to the burst control signal having the first level,
wherein the timer is configured to turn on the second switch and the third switch during the third period, to turn off the third switch during the fourth period subsequent to the third period, and to turn off the second switch and the third switch during the second period subsequent to the fourth period.

12. The power converter of claim 5, wherein the switching controller further comprises a comparator configured to compare the feedback voltage with a burst reference voltage to determine a level of the burst control signal.

13. The power converter of claim 2, wherein the switching controller further comprises a comparator configured to compare the sensing voltage with a lower one of the comparison voltage and the first voltage, and
wherein the switching controller determines a level of the control signal in accordance with a comparing result of the comparator and the burst control signal.

14. A switching controller of a power converter including a transformer and a first switch, the transformer including a primary coil configured to receiving an input voltage and a secondary coil configured to transmit an output voltage, and the first switch including a first terminal coupled to the primary coil, a second terminal, and a control terminal, the switching controller comprising:
a first comparator configured to receive a feedback voltage corresponding to the output voltage and to compare the feedback with a burst reference voltage to output a burst control signal;
a voltage controller configured to generate a comparison voltage in response to the burst control signal having a first level, the comparison voltage being gradually increased;
a second comparator configured to compare a sensing voltage with the comparison voltage to generate a gate control signal during a first period of a burst mode, and to compare the sensing voltage with a first voltage corresponding to the feedback voltage to generate a gate control signal during a second period of the burst mode, the second period being subsequent to the first period, the sensing voltage corresponding to a current flowing between the first terminal and the second terminal of the first switch, and the comparison voltage being lower than the first voltage during the first period; and
a gate signal generator configured to perform the burst mode to perform an operation for turning off the first switch after turning on the first switch at least once in accordance with the gate control signal while the burst control signal has the first level, and to turn off the first switch while the burst control signal has a second level being different from the first level.

15. The switching controller of claim 14, wherein the voltage controller comprises:
a current source; and
a capacitor configured to be charged by a current supplied from the current source while the burst control signal has the first level, and to be discharged while the burst control signal has the second level,
wherein a voltage charged to the capacitor corresponds to the comparison voltage.

16. The switching controller of claim 15, wherein the voltage controller further comprises:
a second switch configured to be turned on in response to the burst control signal having the first level, the second switch coupled between the current source and the capacitor; and
a third switch configured to be turned on in response to the burst control signal having the second level, the third switch coupled between the capacitor and a voltage terminal.

17. The switching controller of claim 14, wherein the voltage controller divides the first voltage to generate at least one second voltage during the first period, and outputs the at least one second voltage as the comparison voltage in ascending order.

18. The switching controller of claim 14, wherein the voltage controller comprises:
a first resistor coupled between a node and a voltage output terminal, the voltage output terminal configured to output the comparison voltage, and the node being applied with the first voltage; and
a second resistor and a second switch coupled in series between the voltage output terminal and a voltage terminal,
wherein the second switch is turned on during the first period and is turned off during the second period.

19. The switching controller of claim 18, wherein the voltage controller further comprises a third resistor and a third switch coupled in series between the voltage output terminal and the voltage terminal,
wherein the third switch is turned on during a third period and is turned off during a fourth period, and the first period includes the third period and the fourth period.

20. A method of driving a power converter including a transformer and a switch, the transformer including a primary coil configured to receiving an input voltage and a secondary coil configured to transmit an output voltage, and the switch including a first terminal coupled to the primary coil, a second terminal, and a control terminal, the method comprising:

operating the power converter in a burst mode;

generating a comparison voltage during a first period of the burst mode, the comparison voltage being gradually increased;

comparing a sensing voltage with the comparison voltage to determine an operation of the switch during the first period, the sensing voltage corresponding to a current flowing between the first terminal and the second terminal of the switch; and comparing the sensing voltage with a voltage corresponding to a feedback voltage to determine the operation of the switch during a second period of the burst mode, the second period being subsequent to the first period, and the feedback voltage corresponding to the output voltage.

21. The method of claim 20, wherein the comparison voltage is lower than the voltage corresponding to the feedback voltage during the first period.

* * * * *